United States Patent [19]

Faulkner

[11] Patent Number: 5,431,140
[45] Date of Patent: Jul. 11, 1995

[54] CLEAN BURNING PRE-COMBUSTION CHAMBER SYSTEM AND METHOD FOR INTERNAL COMBUSTION ENGINES

[75] Inventor: Robert B. Faulkner, Joplin, Mo.

[73] Assignee: Valve Maintenance Corporation, Odessa, Tex.

[21] Appl. No.: 136,894

[22] Filed: Oct. 18, 1993

[51] Int. Cl.6 .................. F02B 19/12; F02B 19/16
[52] U.S. Cl. .................................. 123/254; 123/267
[58] Field of Search .............. 123/254, 256, 266, 267, 123/310, 283, 285

[56] References Cited

U.S. PATENT DOCUMENTS

| | | | |
|---|---|---|---|
| 4,096,832 | 6/1978 | Casull et al. | 123/267 |
| 4,338,897 | 7/1982 | Drumheller et al. | 123/267 |
| 4,736,718 | 4/1988 | Linder | 123/267 |
| 4,884,539 | 12/1989 | Ciccarone et al. | 123/310 |
| 5,222,993 | 6/1993 | Crane | 123/256 |
| 5,241,930 | 9/1993 | Dupler | 123/267 X |

Primary Examiner—Willis R. Wolfe
Attorney, Agent, or Firm—Novak, Druce, Herrmann & Burt

[57] ABSTRACT

A clean burning pre-combustion chamber system and method for modifying existing "dirty" natural gas engines to meet modem exhaust emissions standards includes a number of small, water-cooled pre-combustion chambers which can be threaded into the existing spark plug holes, of which there are two per cylinder. A specially shaped ignition chamber within each pre-combustion chamber enhances fuel flow and virtually eliminates the "knocking" which is typically found in pre-combustion chamber modified engines. The inventive system allows existing engines to be economically converted with minimal or no structural changes to the cylinders, heads or valve covers.

20 Claims, 3 Drawing Sheets

CLEAN BURNING PRE-COMBUSTION CHAMBER SYSTEM AND METHOD FOR INTERNAL COMBUSTION ENGINES

BACKGROUND OF THE INVENTION

1. Field of the Invention

The present invention relates generally to a pre-combustion chamber system for improving the ignition efficiency of an existing internal combustion engine. More particularly it relates to such a system and method in which a pair of specially designed, water cooled pre-combustion chambers are attached to a slow speed reciprocating natural gas engine via the existing cylinder head spark plug holes to provide a pair of high efficiency torch ignition sources for each cylinder.

2. Description of the Related Art

Internal combustion engines which use high volatility fuels such as gasoline or natural gas have traditionally relied upon spark ignition systems. Such spark ignition systems provide adequate ignition energy for most internal combustion engine operating conditions and are particularly effective when the engine is operating at or near full load. However, for certain engines, particularly large, static, natural gas fired engines, traditional spark ignition systems prove inadequate when these engines are operating at less than full load. During operations at less than peak capacity, their fuel governing systems automatically lean out the fuel/air mixture supplied to their cylinders, yielding a fuel mixture with a high ration of air to fuel. Traditional spark ignition systems simply do not provide sufficient ignition energy to ignite such lean mixtures. As a result, large natural gas fired engines operating at lean mixtures tend to experience detonation, misfire, poor fuel economy, and higher emissions of $NO_x$ such as nitric oxide NO and nitrogen dioxide $NO_2$.

One method for countering the undesirable effects of operating large gas fired engines at lean mixtures involves the use of a pre-combustion chamber, often referred to as a torch ignition source. Pre-combustion chambers typically intake a rich fuel air mixture and ignite it using an ordinary spark plug. The result is a burning fuel mixture which is thrust out an exhaust port and into the engine cylinders at high velocity, much like a blow torch. The high velocity flame ignites the lean fuel air mixture within the cylinder.

These pre-combustion chambers for internal combustion engines have been in use for some fifty years. Pre-combustion chambers are relatively small volume chambers which are placed in communication with a corresponding cylinder in the engine. Pilot fuel is provided to the pre-combustion chamber to enrich the fuel-air mixture therein, which is then ignited via the spark plug. The resulting explosion in the pre-combustion chamber then provides the above-described blow torch effect to completely ignite the fuel-air mixture in the engine cylinder.

In the past, the primary purpose of such pre-combustion chambers was to promote more complete combustion of the fuel and thereby increase the fuel efficiency of the engine.

Recently, the increasing emphasis on improving air quality, and more particularly, the Congressional Clean Air Act which takes full effect in 1995, have resulted in pre-combustion chambers being examined for the purpose of improving engine exhaust gas emissions. One of the industries most impacted by the exhaust gas emissions limits imposed by the new law is the natural gas pipeline industry.

The pipeline industry is comprised of a number of companies with a nationwide grid of gas pipelines. The companies act as carriers for natural gas producers by pumping natural gas through their pipeline networks from the producers to the ultimate consumers. Most, if not all of these pipeline companies use natural gas fired internal combustion engines to drive compressors in pumping stations to push the gas through their pipelines. A very large number of these engines are "dirty" slow speed reciprocating engines manufactured prior to 1970. Emissions standards mandated under the National Clean Air Act mentioned above, and equivalent or even more restrictive standards being mandated under a number of individual State Clean Air Acts would render these engines obsolete unless they can be modified to comply. Replacement of each existing engine with later manufactured "clean" engines entails a cost of about 2 million dollars. Replacement of all of the "dirty" engines in the nationwide pipeline network would require an investment of billions of dollars. Therefore, pre-combustion chambers are being actively investigated by a number of companies for their potential in permitting these older engines to be modified to meet the new emissions standards.

Prior art attempts to produce compatible pre-combustion chambers have generally involved a substantial modification of the existing engine cylinder heads to accommodate relatively large single pre-combustion chambers. Often the existing spark plug holes, of which there are two per cylinder in most engines, are plugged and the air start hole is used to connect the pre-combustion chamber. This technique not only necessitates a greatly modified and expensive cylinder head, but also means that the engine so modified cannot be air started. The cost per cylinder of modifying a dirty engine using these techniques can run $100,000 or more, thus costing $500,000 to modify a single, five cylinder engine.

It is clear then, that a need exists for an alternative system and method of modifying existing dirty engines to meet current exhaust emissions standards. Such a system and method should preferably require little modification of the existing engine cylinder heads and should be relatively inexpensive. At the same time, the system must be reliable and capable of a long operating life, should require minimal engine down time to install and should result in substantial emission reductions for the engines so modified.

SUMMARY OF THE INVENTION

In the practice of the present invention, a clean burning pre-combustion chamber system for converting existing "dirty" internal combustion engines to meet rigid exhaust emissions standards includes a pair of relatively small, specially designed pre-combustion chambers for each engine cylinder. Each such chamber is water-cooled, sized and equipped with male threads to screw into one of the spark plug holes in the cylinder head. Most such engines have two spark plug holes per cylinder, thus using two pre-combustion chambers per cylinder allows each chamber to be relatively compact and still achieve a volume ratio between total chamber volume and engine cylinder volume in the range of approximately 17:1 to 24:1. This range is considered to include the optimum ratios for effective use of a pre-combustion chamber.

The use of water cooling allows the dual chambers to be relatively thin walled, permitting them to fit within a standard spark plug access hole, but, at the same time, to be capable of a long useful life. A specially shaped interior ignition chamber includes no sharp corners or edges, thus improving fuel and air flow and virtually eliminating troublesome and dangerous engine "knocking" which is generally associated with pre-combustion chambers.

OBJECTS AND ADVANTAGES OF THE PRESENT INVENTION

The objects and advantages of the present invention include: providing a clean burning pre-combustion chamber system and method for modifying existing natural gas fired "dirty" internal combustion engines to meet modern exhaust emissions standards; providing such a system in which small, specially designed pre-combustion chambers are threaded into the existing engine spark plug holes; to provide such a system in which each pre-combustion chamber is water-cooled to allow for extended operating life; to provide such a system and method in which such engines can be so modified efficiently, and at low cost; to provide such a system in which the pre-combustion chambers incorporate specially designed internal chambers which are shaped to promote fuel and air flow to thereby prevent engine "knocking"; to provide such a method which entails no extensive modification of the existing engine components; and providing such a system and method which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
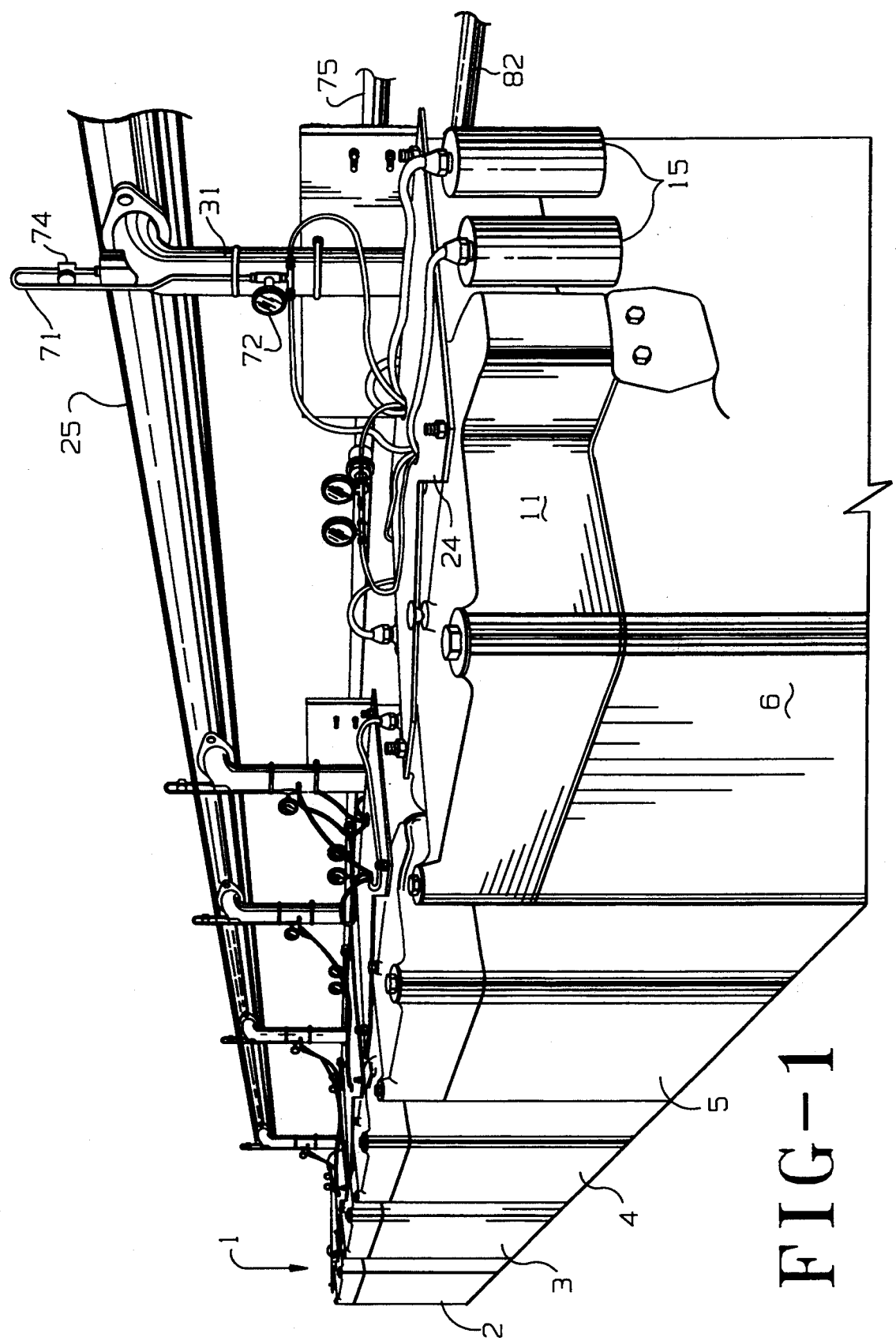
FIG. 1 is a perspective view of a large, natural gas fired internal combustion engine modified in accordance with the present invention.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned derivatives thereof and words of similar import.

Referring to the drawings in more detail, reference numeral 1 in FIG. 1 generally designates a large, five cylinder natural gas fueled internal combustion engine which has been adapted to include the clean burn pre-combustion chamber system of the present invention. The engine 1 includes cylinders 2–6, each of which is substantially identical. Thus, only cylinder 6, the rightmost cylinder in FIG. 1, will be described in detail.

Figure 2:
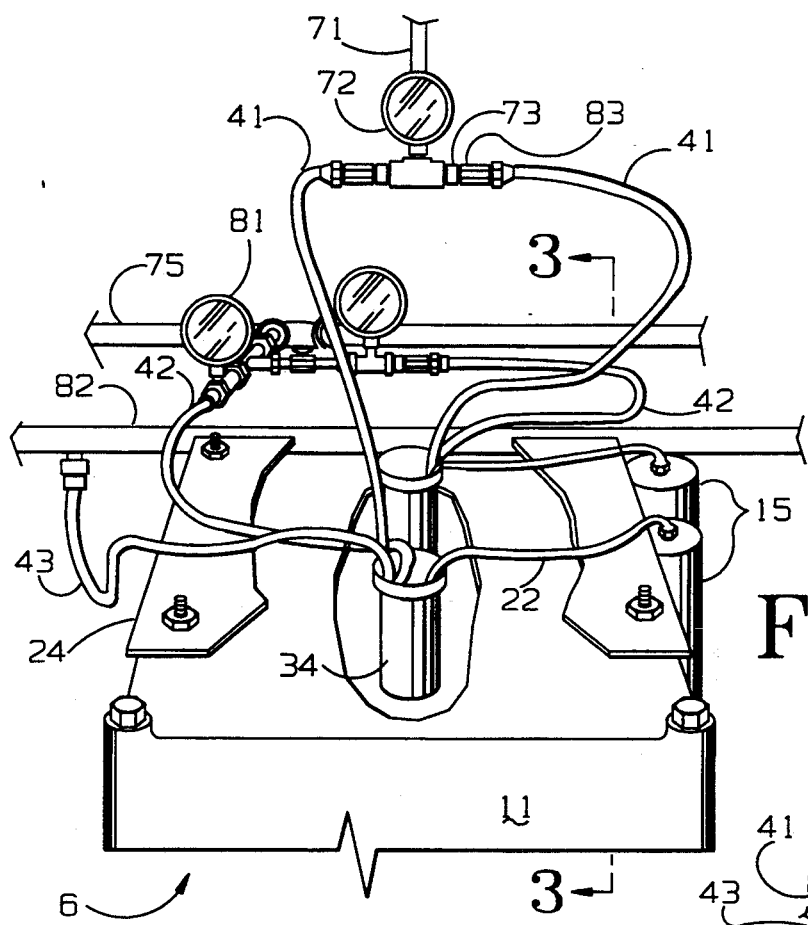
FIG. 2 is an enlarged top front perspective view of a single cylinder from the engine of FIG. 1, modified in accordance with the present invention, with portions broken away to illustrate a pair pre-combustion chamber sleeves positioned therein.
Figure 3:
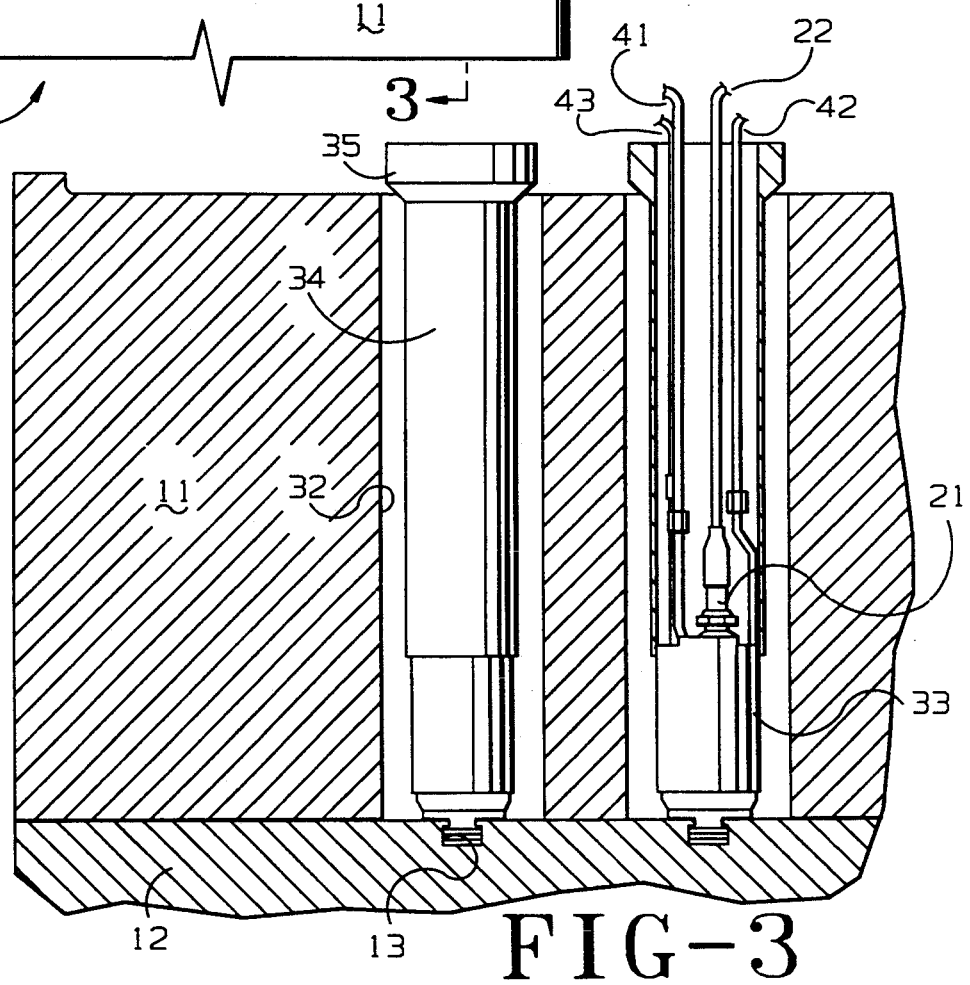
FIG. 3 is a further enlarged, fragmentary, cross-sectional view of the cylinder of FIG. 2, taken generally along line 3—3 in FIG. 2, with one pre-combustion chamber sleeve shown partially broken away to illustrate the interior thereof.

Referring to FIGS. 1–3, the cylinder 6 conventionally includes a valve cover 11 covering a number of intake and exhaust valves (not shown) in the top of a cylinder head 12. The cylinder head 12 is equipped with dual threaded spark plug bores 13 in the top thereof which communicate with the interior of the cylinder 6. A pair of conventional ignition coils 15 provide ignition sparks for a corresponding pair of spark plugs 21 via leads 22. A protective cover plate 24 is bolted over a portion of the valve cover 11. Fuel for the cylinder 6 is provided via an overhead natural gas line 25 and a down pipe 31. Access to the spark plugs 21 is provided via a pair of spark plug access bores 32 in the valve cover 11.

II. Clean Burning Pre-Combustion Chamber System and Method

Each cylinder of the engine 1, including the cylinder 6, has been modified to include a pair of generally cylindrical pre-combustion chambers 33. Each pre-combustion chamber 33 is attached to an elongate sleeve 34, which sleeves 34 include a flared top portion 35 which can act as a handle when installing or removing the sleeve 34 and attached pre-combustion chamber 33. The elongate sleeves 34 and the pre-combustion chambers 33 are positioned entirely within the spark plug access bores 32, which, in some engines, must be made slightly oversized. The sleeves 34 are sized to accommodate the spark plug lead 22, a pre-combustion fuel line 41, a cooling water supply line 42 and a cooling water return line 43.

Figure 4:
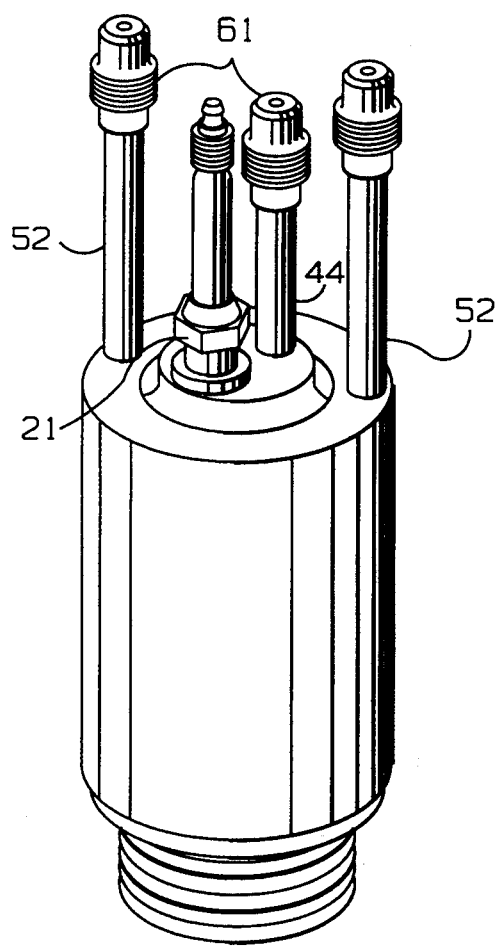
FIG. 4 is a greatly enlarged perspective view of a pre-combustion chamber in accordance with the invention.
Figure 5:
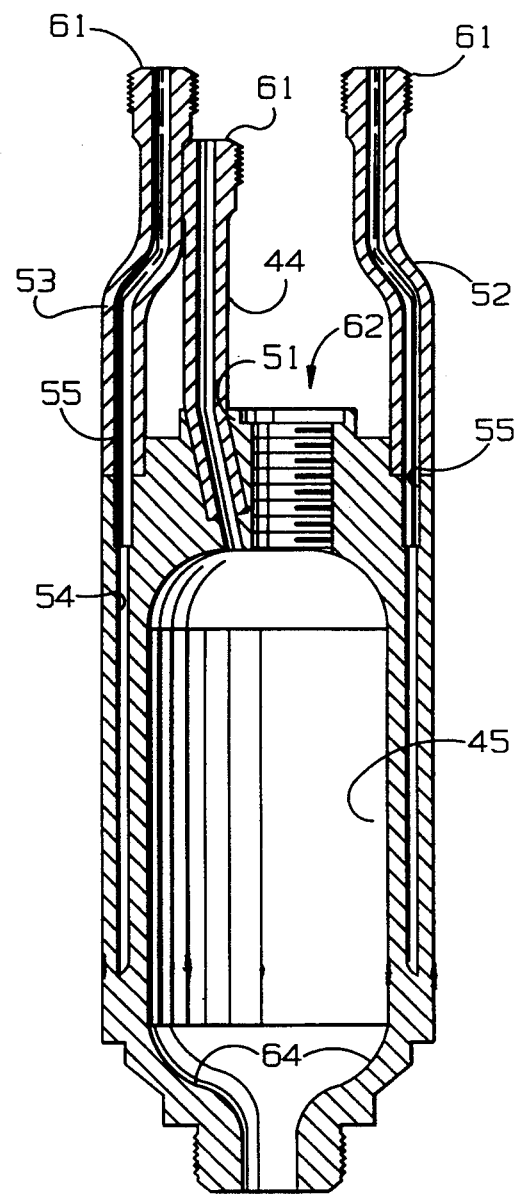
FIG. 5 is a cross-sectional view of the pre-combustion chamber, taken along line 4—4 of FIG. 4.

Referring to FIGS. 4 and 5, each pre-combustion chamber 33 includes a fuel line supply tube 44 which communicates with an interior chamber 45 via a bore 51. A cooling water supply tube 52 and cooling water return tube 53 each communicate with a narrow cooling water reservoir 54, which is basically concentric with and completely surrounds the interior chamber 45. A pair of graduated bores 55 and 56 connect the reservoir 54 with the tubes 52 and 53, respectively. Each of the tubes 44, 52 and 53 includes a threaded adaptor 61 which connects to the respective water or fuel line. The adaptors 61 can be sized or threaded differently to prevent inadvertent connection of the wrong fuel or water lines.

A threaded spark plug bore 62 is positioned in the top of the pre-combustion chamber 33 and allows the spark plug 23 threaded therein to communicate with the interior chamber 45. The interior chamber 45 includes rounded corners 63 and 64 at the top and bottom thereof, respectively, to aid in the smooth flow of fuel and air therethrough.

III. Engine Modification and Operation

To adapt the engine 1 to include the inventive clean burning pre-combustion chamber system, first a pre-combustion chamber fuel line 71 is attached to the respective fuel down pipe 31 for each cylinder 2-6. A fuel pressure gauge 72 is attached to each fuel line 71 and the fuel supply line 41 for each chamber 33 is attached to the respective pressure gauge via a fitting 73. Note that a single pressure gauge 72 can be used to supply fuel to both pre-combustion chambers 33 in each cylinder. A fuel shut-off valve 74 is installed between each pressure gauge 72 and the respective down pipe 31.

A cooling water supply pipe 75, positioned near the engine 1, is connected to a source of water under pressure, such as a coolant boost pump (not shown), and one or more cooling water pressure gauges 81 are connected to the supply pipe near each cylinder. The cooling water supply line 42 for each pre-combustion chamber 33 is connected to a respective water pressure gauge 81. Alternatively, as per the fuel lines 41, a single pressure gauge 81 can supply cooling water to both pre-combustion chambers 33 in each cylinder. A cooling water return pipe 82 is also positioned near the engine 1 and the cooling water return line 43 for each cylinder is connected to the return pipe 75 via fittings 81.

The two ignition spark plugs 21 in each cylinder head are then removed via the access bores 32. Next, the combined pre-combustion chamber 33 and attached sleeve 34, with cooling water supply and return lines 42 and 43, respectively, and fuel supply line 41 attached, are threadably inserted into the spark plug bores 13 via the access bores 32. The spark plugs 21 are then threaded into the bores 62 in the tops of each of the pre-combustion chambers 33 and spark plug leads 22 run between the coils 15 and the spark plugs 21.

The engine 1 is then cranked normally via a conventional air starter or a ring gear starter (not shown). Pilot fuel is introduced into each pre-combustion chamber fuel supply line 41 at a range of from 1-5 PSI above, and preferably at about 1 to 2 PSI above the normal engine cylinder intake manifold pressure. A fuel check valve 83 is positioned within each fuel supply line 41, with each check valve 83 permitting fuel from the respective fuel supply line 41 to enter the respective pre-combustion chamber when pressure in the cylinder 2-6 is less than the pressure within the fuel supply line 41. This occurs during engine downstrokes, with the check valves 83 closing during engine upstrokes. The upstrokes cause a rich fuel-air mixture to be forced from each cylinder 2-6 up into the respective pre-combustion chambers 33 to supplement the pilot fuel already supplied to the pre-combustion chambers 33 via the fuel supply lines 41. The spark plugs 21 then fire in a conventional fashion, igniting the rich fuel-air mixture within each pre-combustion chamber 33. This ignition causes a high velocity jet of flaming gas into the engine cylinder from each connected pre-combustion chamber 33. A relatively lean fuel-air mixture within each cylinder is thereby ignited, yielding a virtually complete combustion and minimal emissions of $NO_x$ gases, as well as other undesirable exhaust gases.

The specially designed water reservoirs 54, by completely surrounding the internal chamber 45, provide efficient cooling of the pre-combustion chambers 33, allowing such small volume chambers to have a relatively long life. Tests of the inventive water cooled pre-combustion chambers 33 have indicated that they have an average useful life of over two years.

In one particular installation involving a five cylinder Worthington UTC-165T engine modified, essentially as illustrated in FIG. 1, with the inventive clean burning pre-combustion system, $No_x$ emissions were reduced from 1800 PPM to less than 600 PPM or well within the relatively strict emissions standards recently adopted by the State of New York. These surprising results were achieved even though only four out of five cylinders were modified. In that installation, the following parameters were utilized:

Pilot fuel pressure at no load: 5 PSI
Pilot fuel pressure at load: 15 PSI
Cooling water pressure: 35–46 PSI The clean burning pre-combustion chamber system according to the present invention can be installed on a variety of natural gas engines, including engines with top-mounted rocker arm covers and other engines such as the in-line Worthington UTC-165T engine illustrated in FIG. 1 with very little modification of the cylinder heads or valve covers. In addition, unlike prior art systems which include a single, larger pre-combustion chamber attached to each air start hole, the present system allows existing air start systems to be retained.

As previously mentioned, complete replacement of a single existing "dirty" engine by a newly manufactured "clean" engine can entail a cost of close to two million dollars and prior art retrofit "clean burn" modifications by original equipment manufacturers have cost as much as $100,000 per cylinder to install. By contrast, the present invention can be installed on an existing engine for as little as $10,000 per cylinder, thus representing an enormous potential savings to the natural gas pipeline industry.

It is to be understood that while certain forms of the present invention have been illustrated and described herein, it is not to be limited to the specific forms or arrangement of parts described and shown.

What is claimed and desired to be secured by Letters Patent is as follows:

1. A pre-combustion chamber for an internal combustion engine, comprising:

a generally cylindrical housing with a diameter sized to fit within a spark plug access bore in a valve cover on said engine;

a male threaded adaptor at the base of said housing, said adaptor being sized to fit within a female spark plug hole on said engine;

a generally cylindrical interior chamber in said housing, said interior chamber including rounded upper and lower surfaces, said rounded lower surfaces communicating with the interior of said male threaded adaptor in a taper toward said spark plug hole; and a female threaded adaptor positioned in the top of said housing to accommodate an ignition spark plug.

2. The pre-combustion chamber as recited in claim 1, further comprising:

a cooling water reservoir positioned within said housing, said reservoir surrounding said interior chamber; and cooling water intake and return fittings connected between said reservoir and the exterior of said housing.

3. A pre-combustion chamber system for modifying an internal combustion engine, said system comprising:

said internal combustion engine having at least one spark plug hole per cylinder, a pre-combustion chamber fluidly connected to each spark plug hole, each of said chambers including a generally cylindrical housing fully contained within a spark plug access bore in an engine valve cover to the cylinder, a male threaded adaptor at a base of said housing, said male adaptor being sized to fit within a female spark plug hole on the engine for mating engagement therewith;

a generally cylindrical interior chamber defined within said housing, said interior chamber including rounded upper and lower surfaces; said rounded lower surface communicating with the interior of said male threaded adaptor for smooth transition thereto in a taper toward said spark plug hole; and a female threaded adaptor positioned in the top of said housing to accommodate an ignition spark plug.

4. The pre-combustion chamber system for modifying an internal combustion engine as recited in claim 3 wherein said pre-combustion chamber is exclusively fueled by natural gas.

5. The pre-combustion chamber system for modifying an internal combustion engine as recited in claim 4 wherein said engine is a natural gas compressor.

6. The pre-combustion chamber system for modifying an internal combustion engine as recited in claim 3, further comprising:

a sleeve attached to each said pre-combustion chamber, said sleeve being of a diameter and length that permits said sleeve to be contained predominantly within said spark plug access bores when attached to said pre-combustion chamber, a top end of said sleeve protruding out of said spark plug access bore to permit the attached pre-combustion chambers to be readily threaded into the spark plug holes in said engine.

7. The pre-combustion chamber system for modifying an internal combustion engine as recited in claim 5, further comprising:

a sleeve attached to each said pre-combustion chamber, said sleeve being of a diameter and length that permits said sleeve to be contained predominantly within said spark plug access bores when attached to said pre-combustion chamber, a top end of said sleeve protruding out of said spark plug access bores to permit the attached pre-combustion chambers to be readily threaded into the spark plug holes in said engine.

8. The pre-combustion chamber system for modifying an internal combustion engine as recited in claim 7, further comprising a flange surrounding the top thereof.

9. The pre-combustion chamber system for modifying an internal combustion engine as recited in claim 8, further comprising a protective cover plate fastened to said engine valve cover over said combustion chamber and sleeve.

10. The pre-combustion chamber system for modifying an internal combustion engine as recited in claim 9, further comprising:

a cooling water reservoir positioned within said housing, said reservoir surrounding said interior chamber; and cooling water intake and return fittings connected between said reservoir and the exterior of said housing.

11. The pre-combustion chamber system for modifying an internal combustion engine as recited in claim 10, further comprising:

a source of cooling water and a cooling water return; and a plurality of cooling water supply lines connected between said cooling water source and respective ones of said intake fittings and a plurality of cooling water return lines connected between said cooling water return and each said return fitting.

12. The pre-combustion chamber system for modifying an internal combustion engine as recited in claim 11, further comprising:

a pilot fuel supply fitting connected between said chamber and the exterior of said housing;

a pilot fuel supply line connected between a source of fuel and said pilot fuel fitting; and a pilot fuel check valve positioned within said supply line.

13. The pre-combustion chamber system for modifying an internal combustion engine as recited in claim 12 wherein each sleeve includes an interior bore extending the length thereof and of a diameter sized to accommodate said pilot fuel supply line, said cooling supply and return lines, and a spark plug lead therein.

14. A method of retrofitting a "dirty" multi-cylinder natural gas fired internal combustion engine to meet "clean" emissions standards, the engine including at least one spark plug per cylinder threaded into corresponding spark plug holes, said method comprising the steps of:

removing said spark plug from said spark plug hole;

installing a pre-combustion chamber in said spark plug hole by threading said chamber into said spark plug hole so that said pre-combustion chamber is fully contained within a spark plug access bore in an engine valve cover to the engine;

connecting a pressurized source of pilot fuel to said pre-combustion chamber via a pilot fuel supply line and fitting;

threadably connecting a pre-combustion spark plug to said pre-combustion chamber; and connecting said pre-combustion spark plug to a source of ignition sparks via a spark plug lead.

15. The method of retrofitting a "dirty" multi-cylinder natural gas fired internal combustion engine as recited in claim 14, further comprising connecting a protective cover plate to said engine valve cover over said pre-combustion chamber.

16. The method of retrofitting a "dirty" multi-cylinder natural gas fired internal combustion engine as recited in claim 15 wherein said pre-combustion chamber includes a coolant reservoir surrounding an internal chamber, each said coolant reservoir being connected to an intake and a return fitting on the outside of said chamber, said method further including the steps of:

connecting a source of coolant under pressure to said intake fitting; and connecting a coolant return to said return fitting.

17. The method of retrofitting a "dirty" multi-cylinder natural gas fired internal combustion engine as recited in claim 15 wherein said pre-combustion chamber is connected to an elongate sleeve, said installing step including inserting said sleeve and connected pre-combustion chamber through a corresponding spark plug access bore in said engine and turning said sleeve to thereby thread said pre-combustion chamber into said spark plug hole.

18. The method of retrofitting a "dirty" multi-cylinder natural gas fired internal combustion engine as recited in claim 17, further comprising connecting a check valve in said pilot fuel supply line.

19. The method of retrofitting a "dirty" multi-cylinder natural gas fired internal combustion engine as recited in claim 18, further comprising regulating the fuel pressure in said pilot fuel supply line to be in the range of 1 to 5 PSI greater than the intake manifold pressure of said engine.

20. The method of retrofitting a "dirty" multi-cylinder natural gas fired internal combustion engine as recited in claim 19, further comprising regulating the fuel pressure in said pilot fuel supply line to be in the range of 1 to 2 PSI greater than the intake manifold pressure of said engine.

* * * * *